United States Patent [19]

Clark, III et al.

[11] Patent Number: 5,027,143
[45] Date of Patent: Jun. 25, 1991

[54] APPARATUS AND METHOD FOR FOCUSING A PHOTOGRAPHIC CAMERA

[76] Inventors: Clarence R. Clark, III, 164 Layayette St., Denver, Colo. 80214; David W. Sanso, 701 Harlan, E38, Lakewood, Colo. 80218

[21] Appl. No.: 459,074

[22] Filed: Dec. 29, 1989

[51] Int. Cl.$^5$ .......................... G03B 5/06; G03B 5/08; G03B 19/10

[52] U.S. Cl. .................................. 354/160; 354/188; 354/189; 354/195.1

[58] Field of Search ............ 354/160, 188, 189, 195.1, 354/195.13

[56] References Cited

U.S. PATENT DOCUMENTS

| 3,825,938 | 7/1974 | Koch | 354/160 |
| 4,564,277 | 1/1986 | Koch | 354/160 |
| 4,692,007 | 9/1987 | Vogt | 354/160 |
| 4,763,147 | 8/1988 | Vogt | 354/160 |

OTHER PUBLICATIONS

Horseman LX-C Camera, advertisement in Studo Photography Magazine, Jan. 1990.
Horseman L-Series Monorail View Cameras, sales brochure No. 89630000, no date.

*Primary Examiner*—Michael L. Gellner
*Attorney, Agent, or Firm*—J. Preston Oxenham

[57] ABSTRACT

A preferred embodiment of a photographic camera comprises a lens standard supporting an optical lens and a screen standard supporting an image screen. At least one of the lens standard and screen standard is movable to vary a distance along the longitudinal camera axis by which they are separated, and one of the lens and screen is rotatable about an axis normal to its optical axis. A reel means, including a drum rotatable about a drum axis for coiling a flexible extension member, is fixed in geometric relation to one of the standards. Rotation signaling means generates a rotation signal in response to rotation of the drum means. A distal end portion of the flexible extension member is fixed in relation to the other of the standards such that, when the distance is decreased or increased, the drum means is caused to rotate about the drum axis. A computer receives the rotational signal and computes a length indicative of a difference in the length by which the first and second standard are separated when a first and second point in the object plane are brought into focus on the image screen and computes an angle through which the lens or screen must be rotated to bring the complete object plane into focus in compliance with Sheimpflug's law.

21 Claims, 4 Drawing Sheets

APPARATUS AND METHOD FOR FOCUSING A PHOTOGRAPHIC CAMERA

TECHNICAL FIELD

The present invention relates to focusing photographic cameras in general, and more particularly to focusing photographic cameras having a lens plane and a film plane which can be adjusted both translationally and angularly relative to one another. Most particularly, the present invention relates to focusing photographic cameras having an image screen in a plane coincident with the film plane on which an image may be viewed during focusing of the camera and which provide for translational and angular adjustment of the image screen plane and lens plane relative to one another.

BACKGROUND OF THE INVENTION

Professional photographers often prefer to use cameras which provide a maximum number of degrees of freedom for adjustment of the relationship between the camera lens and the film plane. Such cameras are preferred by professional photographers because they allow special effects to be achieved relating to perspective and sharpness of the photographic image by pivoting and displacing the film and lens plane relative to one another. During adjustment of the camera, the image to be photographed is viewed on an image screen in the image plane, and after lens and image screens adjustment are completed to achieve the focus and appearance desired by the photographer, the image screen is replaced by a film holder which holds the film in the image plane for exposure. Such cameras can generally be classified as of two types: studio or view cameras and field, or flat-bed cameras.

Studio cameras generally include a support bar running longitudinally from the front to the back of the camera on which slidable carriers with support standards are mounted to support an image screen and a lens holder. The distance between the image screen and lens holder of such cameras may be adjusted by moving the slidable carriers along the support bar and, additionally, each of the image screen and lens holder may be moved both translationally, in directions normal to the longitudinal support bar, and rotationally, about axes normal to the support bar.

Field cameras are most often utilized outside of the studio and the number of degrees of freedom of adjustment between the lens and image screen of these cameras may be sacrificed in the interest of providing a more rugged, compact and managable camera. Field cameras generally fold into a compact package for transport. When these cameras are unfolded, a base extends outwardly away from the image screen to provide a horizontal bed upon which a lens holder, including a lens standard, is mounted to support the lens before the image screen. Most commonly, these cameras provide at least one degree of rotational freedom for the lens about a horizontal axis parallel to the film plane by means of a hinge on the lens support assembly. Both studio and field cameras are provided with bellows extending from the image screen to the lens holder to prevent impingement of ambient light upon the image screen and film.

In addition to adjustment of perspective of the photographic image, the provision of at least one rotational degree of freedom, by pivotally connecting the image screen or lens holder to the image of an object or objects which lie in a common subject plane at varying distances from the camera. This is accomplished by application of Scheimpflug's Law, which is well known by those knowledgeable in the art, and which states that, for optimum focusing of the image in the film plane, adjustment of the camera lens and film planes should be such that the lens plane, passing through the optical center of the lens and normal to the optical axis of the lens, and a plane containing the points of the object whose images are to be focused simultaneously, should meet in a common line of intersection with the film plane.

Successfully accomplishing this arrangement of the lens, object, and image planes by trial and error adjustment can be tedious and time consuming. Particularly where the rotational axis about which the image plane or the lens may be rotated is a large distance from the optical axis of image plane or lens, rotational adjustment of the image plane or lens may be accompanied by a varied loss of focus of image points and a lateral translation of the image on the image screen. Many iterations of alternately adjusting rotation, longitudinal translation and lateral translation of the image screen and lens may be required to obtain sharp focusing together with the desired image position and perspective.

In addition to the problems of achieving focus of object points lying in a common subject plane which is not parallel to the film plane, photographers using view and field cameras are also faced with the problem of achieving an adequate zone of focus, or depth of field, about the focused plane. An increased zone of focus, or depth of field, may generally be achieved by reducing the aperture, by means of a variable opening, of the lens. For most lenses used by professional photographers, initial reduction of the aperture leads to improvement of the image quality as effects of lens aberrations are reduced. However, as reduction of the lens aperture is continued, diffraction effects degrade the image quality. Therefore, the problem facing the photographer is to determine the lens aperture which provides the necessary depths of field while also providing the best possible image quality as effected by a combination of lens aberration and aperture induced diffraction.

A number of attempts have been made in the previous art to ease the process of applying of Scheimpflug's Law in focusing field and studio cameras. These include device utilizing simple mechanical indexes applied to camera elements, such as the device disclosed in U.S. Pat. No. 3,825,938 to Koch, and devices employing a large number of sensors to record the exact locations of the camera elements in order to facilitate precise observance of the relationships mandated by Scheimpflug's Law and achieve ideal setting of the film carrier and lens carrier, such as at he device disclosed in U.S. Pat. No. 4,564,277 to Koch et al. The simpler, less expensive, mechanical index approach is not precise because of its reliance upon visual observation of mechanical analog scales and may be awkward to use because the mechanical scales are associated with different camera elements at different locations on the camera. The approach of precisely instrumenting and recording of camera adjustments is expensive and is only truly practical for use in a protected studio environment. Further, devices of the prior art incorporating each of these approaches have not been suitable for purposes of retrofitting existing studio and field cameras due to the difficulty of adapting mechanical scales or sensors to the many different parts and configurations of existing studio and field camera equipment.

DISCLOSURE OF THE INVENTION

It is an object of the present invention to provide a device which will facilitate the rapid and accurate adjustment of a view or field camera in compliance with Scheimpflug's Law.

It is also an object of the present invention to provide a device which will facilitate the rapid and accurate adjustment of a view or field camera, including the selection of lens aperture, to provide proper focus and an adequate depth of field while minimizing image degrading effects of lens aberrations and lens aperture diffraction.

It is an object of the present invention to provide a device which may easily be retrofitted to a wide range of existing studio and field cameras of diverse structural configurations.

It is an additional object of the present invention to provide a device which will allow inexpensive retrofit of existing studio and view cameras.

It is also an object of the present invention to provide a device which will not be cumbersome when integrated with a studio or field camera during manufacture or when retrofitted to existing studio and field cameras.

It is yet a further object of the present invention to provide a compact focusing device which will allow the image and lens standards of a studio or field camera to be positioned in close proximity.

It is a further object of the focusing device of the present invention to obtain maximum benefits and versatility in assisting in camera adjustment while utilizing a minimum number of sensing devices.

It is also object of the present invention to allow adjustment of the camera with a minimum requirement to leave the view of the image screen.

It is yet another object of the focusing device of the present invention to accommodate lateral movement of the image screen and lens relative to the longitudinal camera axis without comprising the quality of focusing performance.

It is a further object of the focusing device of the present invention to provide information related to exposure and other camera settings, in addition to information related to focusing, in a single compact package.

In accordance with the above objectives, the focusing device of the present invention includes a flexible extension member and a reel with a drum about which a portion of the flexible extension member is coiled. The reel is provided with a means for attachment to move in fixed relation to one of the image screen or lens support standards, and the distal end of the extension member is attached by an attachment post, or similar means, to move in a fixed geometric configuration with the other of the support standards. A bias is applied to the reel drum to cause the flexible member to coil onto the drum when the standard are brought in closer proximity and to allow the extension member to be drawn from the drum when the standards are moved apart. The reel also includes a signalling means, such as an encoder, to generate a rotation signal representative of the angular displacement of the drum from which signal the extent of relative longitudinal movement of the lens and image-screen standard may be determined. The focusing device of the present invention further includes a computer with a port for receiving the rotation signal, a keyboard for inputting data to the computer, and a display to display output from the computer. In a preferred embodiment, index marks extending along two axes from an origin, or reference point, on the image screen are provided for determination of distances between points focused on the image screen and the origin on the image screen.

In accordance with the present invention, during focusing of the camera in compliance with Scheimpflug's Law, the image screen is adjusted to be parallel to the lens plane and the lens standard and image-screen standard are adjusted longitudinally along the bed or support bar of the camera to focus a first image point of the desired object plane on the image screen. While the standards are in this nominal position as measured along the bed or support bar, a nominal position signal is entered via the keyboard and the distance of the point focused on the image screen from the origin on the image screen, as measured along one of the axes, is estimated with the aid of the index marks and inputted to the computer via the keyboard. The image-screen or lens standard is then adjusted to a second longitudinal position along the bed or support bar to bring a second point of the desired object plane into focus on the image screen and, with the standards in this position, a second position indication is inputted to the computer via the keyboard and the distance of the second point focused on the image screen from the origin, as measured along the same axis, is estimated and inputted via the keyboard. The angle of rotation, $\alpha$, through which the image screen or camera lens must be rotated to bring the complete object plane into best focus in compliance with Scheimpflug's Law is then computed by the computer utilizing the distances of the first focused point and second focused point from the origin on the image screen as entered via the keyboard, general camera configuration data entered to a computer memory at the time the camera was manufactured or the focusing device was fitted to the camera, and signals received from the encoder of the reel assembly during the time period between input of the nominal position signal and input of the second position signal.

Further, in accordance with the present invention, during adjustment of the zone of focus, or depth of field, the lens standard and image standard are adjusted longitudinally along the bed or support bar of the camera to bring the most distant point in the desired zone of focus into focus on the image screen. While the standards are in this nominal position along the camera bed or support bar, a nominal position indication is inputted to the computer by the computer keyboard. The image screen or lens standard is then adjusted to a second longitudinal position along the camera bed or support bar to bring the point in the desired zone of focus which is nearest the camera into focus on the image screen, and, with the standards in this position, a second position indication is inputted to the computer by the keyboard. The optimum longitudinal position to which the image or lens standards should be adjusted, and the optimum lens aperture to which the lens should be adjusted is then computed by the computer and displayed utilizing the instant data entered via the keyboard, general camera and lens configuration parameters entered to the computer memory at the time the camera was manufactured or the focusing device was fitted to the camera, and signals received from the encoder of the reel assembly during the time period between input of the nominal position signal and input of the second position signal.

The lens or image screen standard is then moved longitudinally along the camera bed or support bar toward the prescribed optimum position and the computer causes the display to signal the camera user when that position is achieved.

A central processing unit of the computer may also be programmed to provide camera setting information relating to focusing, exposure, and other photographer concerns in addition to correction angle for compliance with Scheimpflug's Law and depth of field based upon additional keyboard input, encoder signals, and data stored in the computer memory.

Other objects, advantages and aspects of the invention will become apparent upon reading of the following detailed description and claims and upon reference to the accompanying drawings.

DETAIL DESCRIPTION OF THE INVENTION

Figure 1:
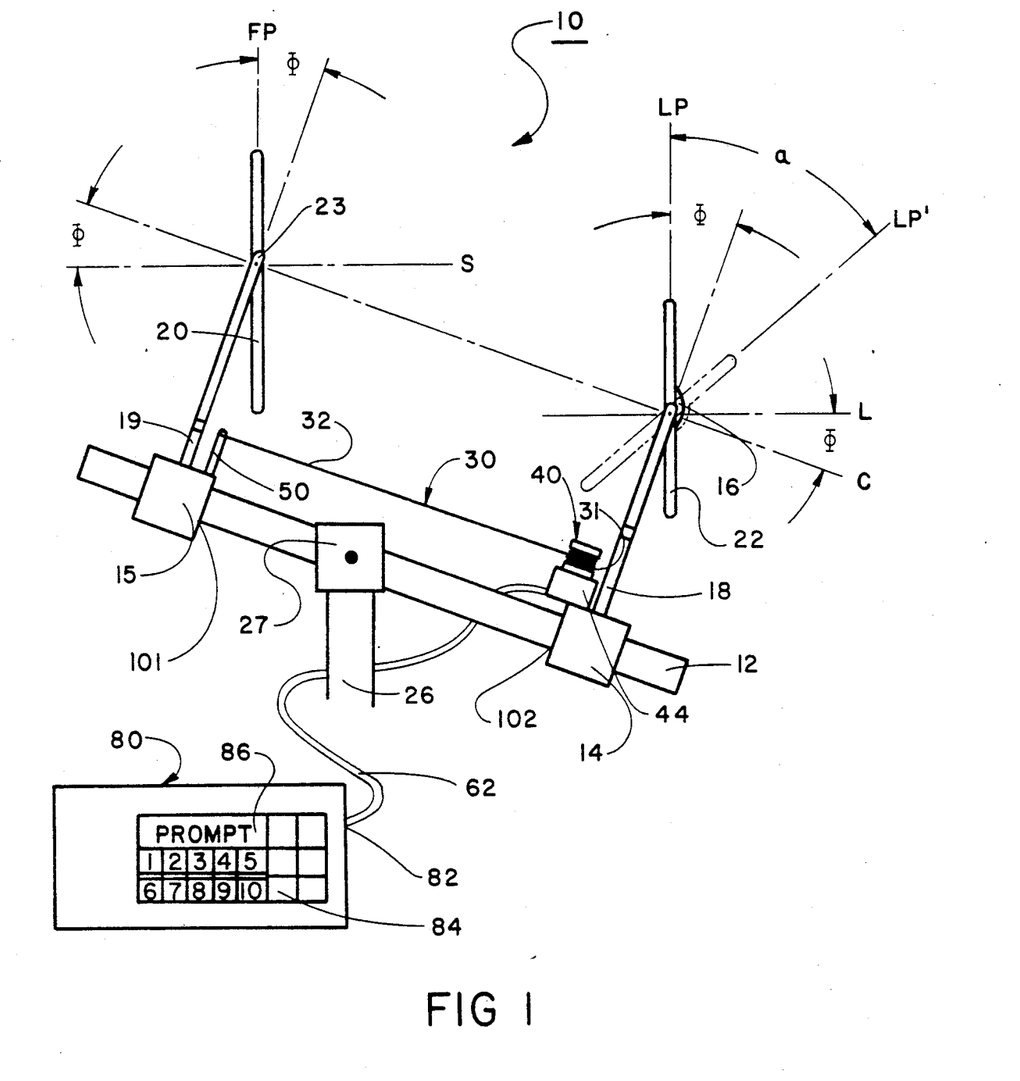
FIG. 1 is a schematic side elevation view of a view camera comprising an exemplary preferred embodiment of the present invention.

A view camera comprising a preferred embodiment of the present invention is illustrated schematically in FIG. 1. View camera 10 comprises support bar 12 upon which lens carrier 14 and screen carrier 15 are adjustably mounted. Lens 16 is supported above carrier 14 by lens standard 18 which includes lens mount 22, and image screen 20 is supported above carrier 15 by screen standard 19 which includes screen mount 23. Screen mount 23 and lens mount 22 provide for adjustment of screen 20 and lens 16 by allowing relative movement of screen 20 and lens 16 translationally along vertical and horizontal coordinates normal to screen axis S and lens axis L and rotationally about vertical and horizontal axis normal to screen axis S and lens axis L. When focusing a desired image upon image screen 20 in the image plane, lens carrier 14 and screen carrier 15 may be selectively positioned along support bar 12 to vary the distance longitudinally along camera axis C by which lens 16 and screen 20 are separated.

View camera 10 is supported by stand 26 upon which support bar 12 is mounted by camera mount 27. Camera mount 27 allows selected positioning of support bar 12 rotationally about both a vertical and horizontal axis. A light excluding bellows assembly surrounding the space between lens 16 and screen 20 is not shown in the figures for clarity of the illustrations.

Reel assembly 40 of view camera 10 comprising an exemplary preferred embodiment of the present invention includes base 44 upon which drum 42 is rotatably mounted. Base 44 of reel assembly 40 is mounted upon carrier 14 to move in fixed relation to lens standard 18. A distal end of flexible extension member 30 is attached to mounted pen 50. Mounting pen 50 is mounted on screen carrier 15 to move in fixed relation to screen standard 19. Reel end portion 31 of flexible extension member 30 is coiled about drum 42. As may be seen more clearly in FIG. 2, drum 42 of the exemplary embodiment is biased by coil spring 46 to rotate in a reeling direction to maintain distal portion 32 of flexible extension member 30 in tension so that distal portion 32 extends along a straight line from drum 42 to its attachment point upon mounting pen 50. Thus, when either of lens standard 18 or screen standard 19 are moved along camera axis C by adjustment of lens carrier 14 or screen carrier 15, respectively, the length of distal portion 32 of flexible extension member 30 will vary in accordance with the change in spacing between screen standard 19 and lens standard 18. When a space between screen standard 19 and lens standard 18 is decreased, biasing spring 46 will cause drum 42 to rotate in a reeling direction and coil a greater length of flexible extension member 30 on drum 42. When the space between screen standard 19 and lens standard 18 is increased, an additional length of flexible extension member 30 will be drawn from drum 42 causing drum 42 to rotate in an opposite, unreeling, direction.

Figure 2:
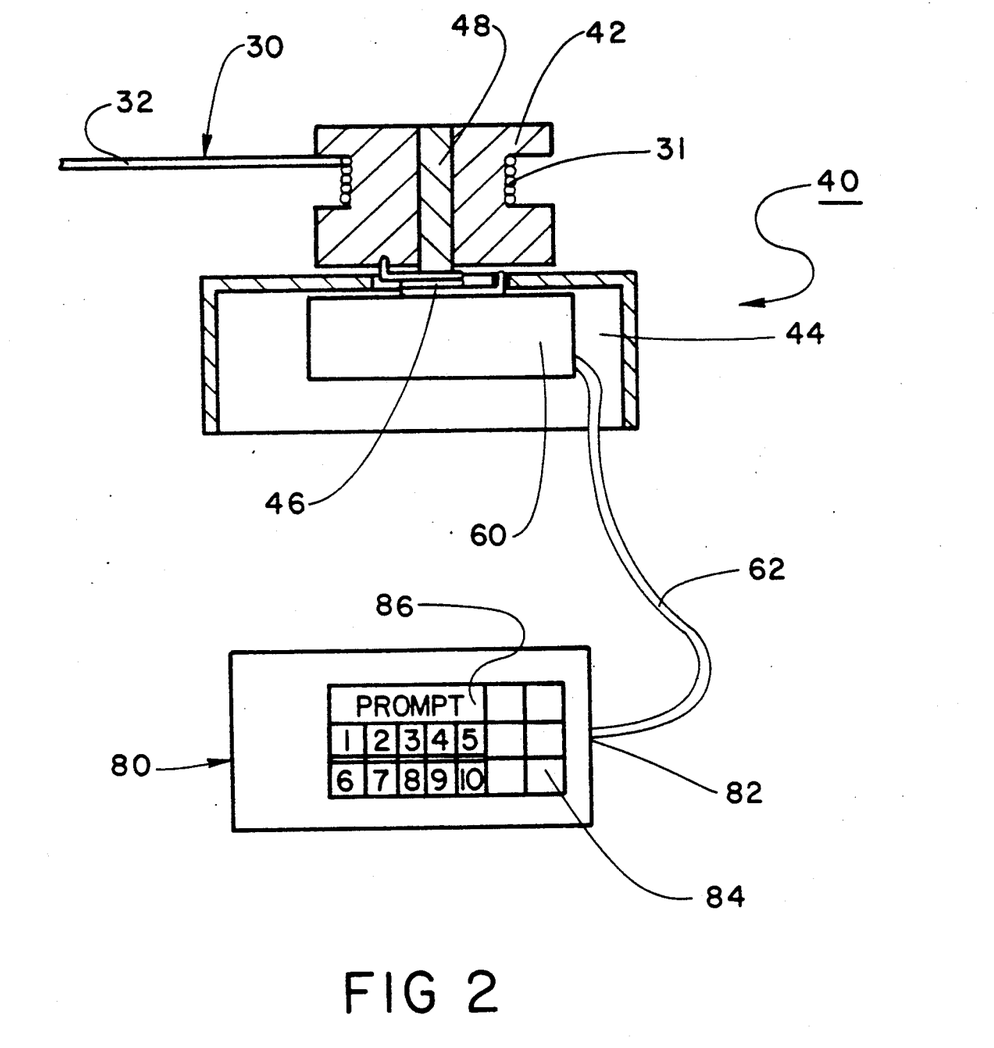
FIG. 2 is a schematic sectional view of the reel assembly of the embodiment of FIG. 1

As may be seen in the schematic sectional view of FIG. 2, drum 42 of reel assembly 40 is mounted upon shaft 48 of encoder 60. When drum 42 is rotated, a rotation indication signal is generated by encoder 60 indicating the direction and extent of rotation of drum 42. Rotation signals generated by encoder 60 are conveyed by cable 62 to rotation signal input port 82 of computer 80. In addition to rotation signal input port 82, computer 80 includes a central processing unit, internal memory, data input keys 84 and output display 86. The central processing unit of computer 80 is programmed to process data accessed from internal memory, inputted by port 82 and inputted by keyboard 84 and also to prompt for data to be entered by a photographer using view camera 10. The internal memory of computer 80 is provided with base data characterizing the physical structure and photographic and optical parameters of view camera 10 and lens 16 at the time the camera is manufactured or retrofitted with the focusing device. The base data may be changed from time to time, to reflect camera and accessory changes, via keyboard 84.

Figure 3:
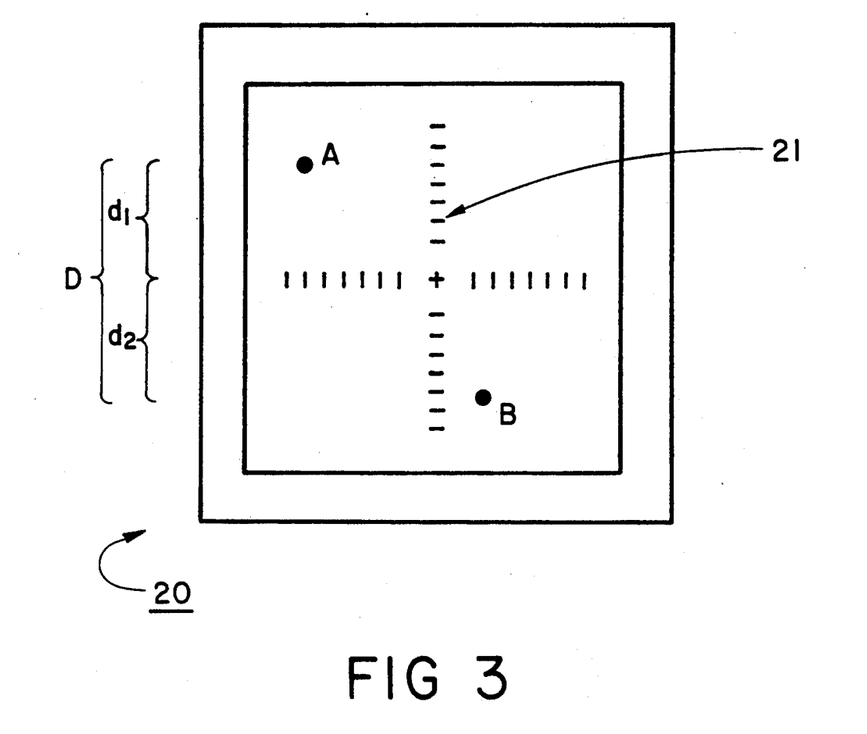
FIG. 3 is a front elevation of the image screen of the embodiment of FIG. 1.

Image screen 20 of view camera 10, comprising an exemplary embodiment of the present invention, is provided with index markings 21 extending along two axes from an origin, or reference point, which may be used to determine distances along the axes between points on image screen 20 and the origin.

In accordance with the present invention, when view camera 10 comprising the present invention is in use, a user photographer may initiate a focusing sequence to optimize the angular setting of screen 20 and lens 16 about their horizontal axis, as seen in FIGS. 1 and 3, by means of keyboard 84. Upon initiation of a focusing sequence by the photographer, display 86 will display a prompt to prompt the photographer to adjust screen 20 and lens 16 about their horizontal axes such that the lens plane, LP of lens 16 is parallel to the film plane FP of image screen 20, and to position lens standard 18 and screen standard 19 such that a point of the desired image to be photographed is focused at a point, for example, point A in FIG. 3, on image screen 20. With lens standard 18 and screen standard 19 so positioned, the photographer inputs a nominal indication to computer 80 by means of keyboard 84. Additionally, display 86 will display a prompt to prompt the photographer user to estimate distance $d_1$ along a vertical axis from the origin and to input the estimate of distance $d_1$, to computer 80 via keyboard 84. After inputting distance $d_1$, the photographer is prompted by computer display 86 to adjust standards 18 or 19 to a second longitudinal position such that a second point of the desired image to be photographed is focused at a second point, for example, point B in FIG. 3, on image screen 20. While lens standard 18 or screen standard 19 is so adjusted, the user photographer inputs a second indication to computer 80. Upon input of this second indication, computer 80 causes display 86 to prompt the photographer to estimate a distance $d_2$ between the origin of indices 21 and focus point $d_2$ along a vertical axis. Display 86 will then prompt the photographer user to input an estimate of the angle $\Phi$ which image screen 20 is angularly displaced from a position normal to support bar 12 or the bed of the field camera, and to input that estimated value be means of keyboard 84. In the case where screen 20 is vertical and support bar 12 is inclined, screen displacement angle $\Phi$ may be estimated with the aid of weighted or bubble type leveling devices on the camera bar. Angle $\Phi$ may also be determined by reference to known retention positions of screen 20 about standard 19 or support bar 12 about stand 26, scales provided on the camera, or any other means well known to those in the art. After the value of $\Phi$ has been inputted, the computer will cause screen 86 to prompt the photographer to indicate whether screen standard 19 or lens standard 18 was moved during the focusing process. Display 86 may, of course, be supplemented or replaced with other visual and acoustic devices, for example, lights and buzzers, to prompt the user.

Upon input of the nominal indication, second indication, distances $d_1$ and $d_2$, and angle $\Phi$, computer 80 determines a correction angle $\alpha$ by which lens plane LP should be rotated to a position LP' as shown in FIG. 1, for optimum focus of the desired image on image screen/film plane 20 as follows:

(a) rotation indication signals generated by encoder 60 and received through port 82 during the period beginning at the time the nominal indications is inputted and the time the second indication is inputted are processed, together with stored data base parameters, to determine the change in spacing, $\delta s$, between image screen carrier 15 and lens carrier 14 along the longitudinal camera axis which occurred during that period;

(b) correction angle $\alpha$ is computed by application of an appropriate algorithm derived from Scheimpflug's Law as follows:

(i) where the change in spacing $\delta s$ was determined by maintaining lens carrier 14 in a fixed position along support bar 12 and moving only screen carrier 15, in accordance with the relation $$\tan \alpha = \frac{\delta s \cos \Phi}{d_1 + d_2 + \delta s \sin \Phi}$$

(ii) or, alternatively, where the change in spacing $\delta s$ was determined by maintaining screen carrier 15 in fixed position and moving only lens carrier 14, in accordance with the relation $$\sin \alpha = \frac{\delta s \cos \Phi}{d_1 + d_2}$$

(c) correction angle $\alpha$ is displayed on display means 86.

The photographer may then read the adjustment angle information present on display 86 and adjust lens plane LP lens 16 of view camera 10 accordingly by applying correction angle, $\alpha$, to tilt the lens plane LP to position LP'. In some camera configurations, the photographer may be required to input only a single distance D, where $D = d_1 + d_2$, the cumulative vertical distance between points A and B on the screen. Also, under certain other conditions, adjustment angle $\alpha$ may be manipulated algebraically to determine correction angles to be applied as needed to each of screen 20 and lens 16. While operation of the present invention has been described with regard to correction of the angular setting of screen 20 or lens 16 about a horizontal axis, as seen in FIG. 1, similar processes may be utilized to affect correction about any selected axis about which lens 16 and screen 20 are adjustable.

Flexible extension member 30 of the embodiment of FIG. 1 is preferably fabricated of plastic coated stainless steel cable, but may be fabricated of any suitably nonextensible, low friction flexible element. While, in the embodiment of FIG. 1, flexible extension member 30 is fastened to screen carrier 15 by means of pin 50, those knowledgeable in the art will recognize the any suitable fasting means may be used, for example, a hook fastened to the distal end of flexible member 30 to engage standard 19, or a screw and eye or other suitable retentive mounting. While, in the exemplary embodiment, coil spring 46 provided biasing to drum 42, other means known to those knowledgeable in the art may be utilized including gravitational, electronic, magnetic, or pneumatic biasing devices, or devices utilizing alternative elastic members. Those of the art will also understand that alternative signaling means may be substituted for encoder 60 to generate a signal characteristic of a change in length of extension portion 32. For example, flexible member 30 may be magnetically or optically coded and a sensor provided relation to the drum axis to detect the code as member 30 is coiled and utilized. Various potentiometer, variable capacitance, and alternative optical devices may also be employed.

In accordance with the present invention, a photographer user may also initiate a depth of field optimizing sequence by means of keyboard 84. Upon the initiation of the depth of field optimization sequence, computer 80 will cause display 86 to display a prompt to prompt the photographer user to position lens standard 18 and screen standard 19 at fiducial positions 101 and 102 marked a known distance apart longitudinally along camera bar 12. With lens standard 18 and screen standard 19 so positioned, the photographer inputs an indication by means of keyboard 84. Computer 80 then loads an encoder register with the known distance between fiducial positions 101, 102 along bar 12 which is entered, together with other camera and lens parameters, to a computer memory at the time the computer is manufactured or at the time the focusing device is fitted to the camera. Natural stops or other indices may be utilized, rather than fiduciary marks, on some cameras. Also, in the case of certain cameras, it may be possible to eliminate the need for this calibration step by providing magnetic, optical or other index markings on flexible member 30 and a sensor at reel assembly 40 to register passage of the index marks and establish an absolute distance between the lens standard 18 and image screen standard 20. Computer 80 will then cause display 86 to display a prompt to prompt the photographer to position lens standard 18 and screen standard 19 such that a point in the desired zone of focus farthest from the camera is focused on image screen 20. With lens standard 18 and screen standard 19 so positioned, the photographer inputs a nominal indication by means of keyboard 84. After the nominal indication is inputted, computer 80 causes the photographer to be prompted by computer display 86 to adjust lens standard 18 or screen standard 19 to a second position such that the point of the desired zone of focus nearest the camera is focused on image screen 20. While lens standard 18 or screen standard 19 is so adjusted, the user-photographer inputs a second indication via keyboard 84.

Upon input of the second indication, utilizing information stored in computer memory at the time of the nominal indication and data previously entered in the computer memory defining camera configuration and lens data, computer 80 computes the exact location along support bar 12 to which lens standard 18 or screen standard 19 must be returned and the optimum aperture to which camera lens 16 should be set to produce a focused image of the zone between the near and far object points as chosen by the photographer user, in accordance with the following relations:

$$M_F = \frac{F - L}{L}$$

$$M_N = \frac{N - F}{L}$$

$$FS = \frac{(N - F)}{Z(2 + M_F + M_N)}$$

$$O = N - [FS \cdot Z \cdot (1 + M_N)]$$

Where,
FS = optimum aperture for achieving required depth of field and optimum image definition.
O = optimum distance between lens standard 18 and image screen standard 19 to achieve required depth of field at optimum aperture
F = distance between lens standard 18 and screen standard 19 when the farthest object point in the selected zone of focus is focused on the image screen
N = distance between lens standard 18 and screen standard 19 when the nearest object point in the chosen zone of focus is focused on image screen 20
L = focal length of lens 16
Z = circle of confusion (representative of the limit of resolution of the human eye)
$M_F$ = subject to image magnification ratio when the camera is focused on the farthest object point $$M_F = \frac{F - L}{L}$$

$M_N$ = subject to image magnification ratio when the camera is focused on the nearest point $$M_N = \frac{N - L}{L}$$

Figure 4:
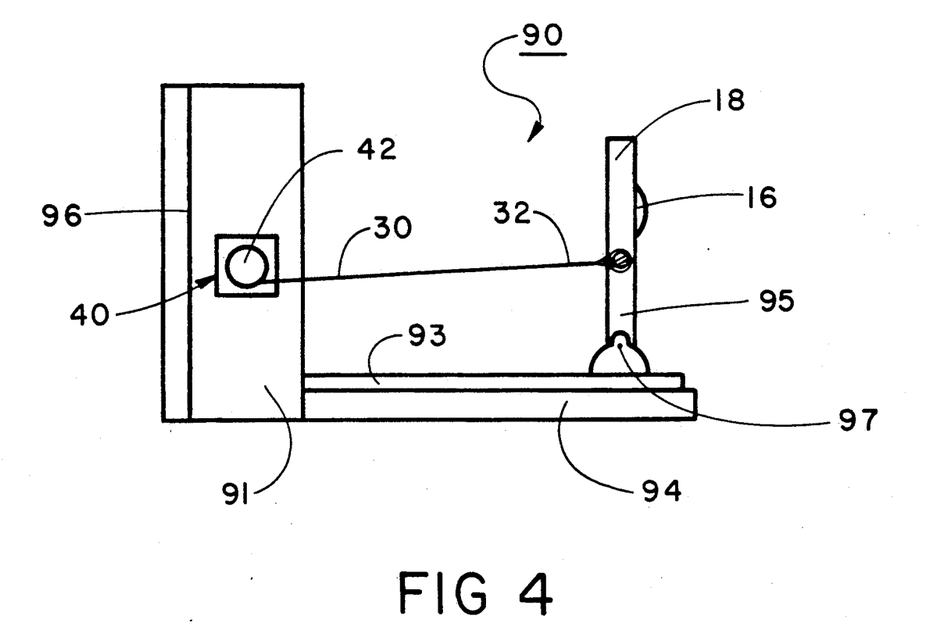
FIG. 4 is a schematic side elevation of a field camera comprising an alternative embodiment of the present invention.

An exemplary field camera 90 embodying the present invention is illustrated in FIG. 4. Exemplary field camera 90 comprises reel assembly 40 mounted on camera body 91. Lens holder bulkhead 95, comprising the lens standard, is adjustable longitudinally along fold-out bed 94 on rails 93 to assist in focusing the desired image upon image screen 96. Lens 16 may be rotated about a horizontal axis by pivoting lens holder 95 at hinge 97. As in previous illustrations, light excluding bellows extending between bulkhead 95 and camera body 91 have not been shown for clarity. Operation of field camera 90 embodying the present invention is similar to that of studio camera 10, except that the number of degrees of freedom available to adjust image screen 96 relative to lens 16 are reduced. In the case of field camera 90 of FIG. 4, only lens 16 is rotatable, and thus all of correction angle α will be applied to rotation of the lens 16.

Figure 5:
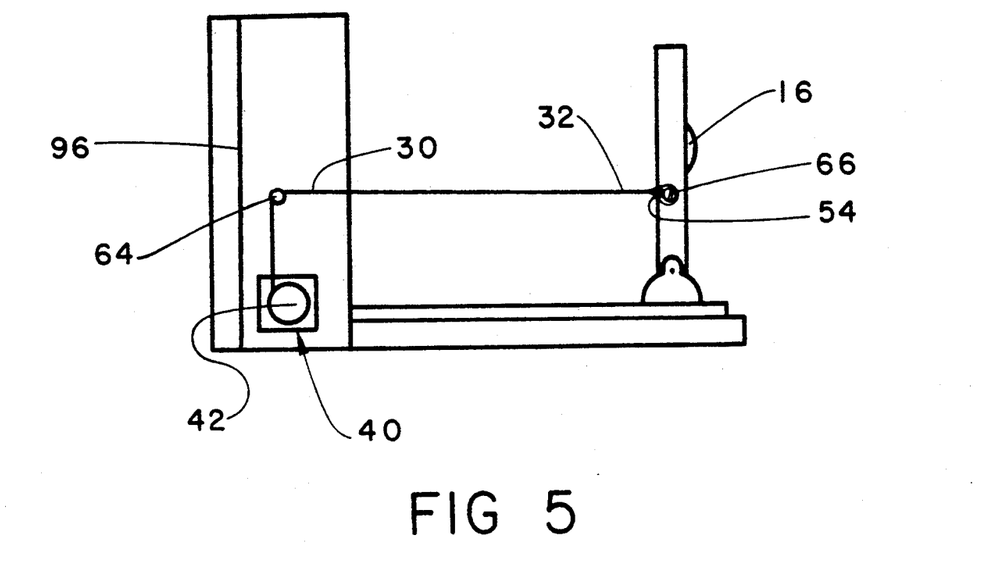
FIG. 5 is a schematic side elevation of a field camera comprising a third embodiment of the present invention.
Figure 6:
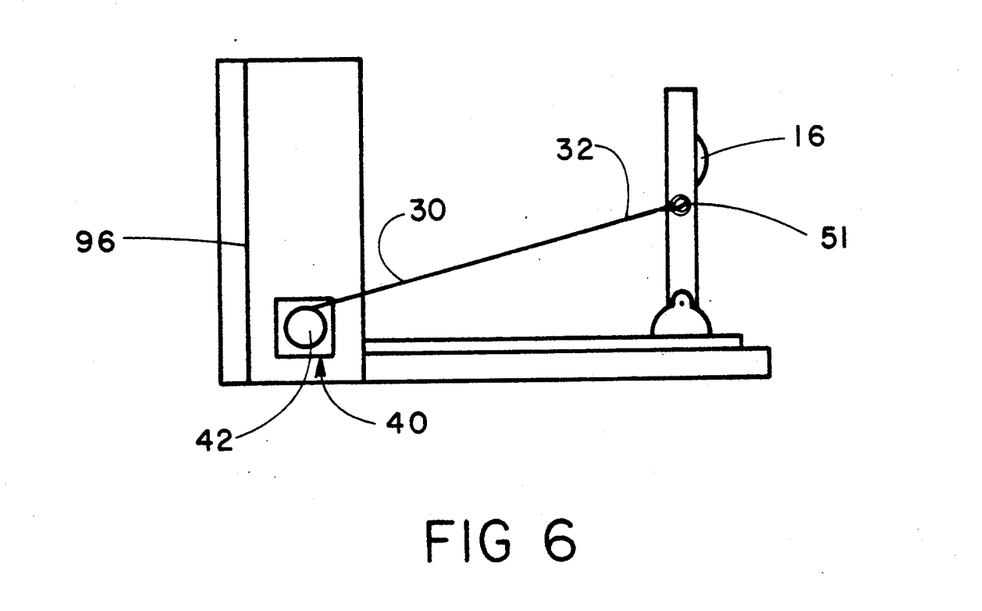
FIG. 6 is a schematic side elevation of a field camera comprising a fourth exemplary embodiment of the present invention.

In addition to providing a compact focusing device by virtue of coiling upon drum 42, flexible extension member 30 also provides adaptability to accommodate varied camera geometry where existing cameras are to be retrofitted to embody the focusing device of the present invention. Guides, such as pulley 64 of FIG. 5, may be used to laterally displace the extension portion of flexible extension member 30 to allow obstructions presented by the camera structure to be avoided or to allow reel assembly 40 to be placed in a less intrusive location. Further, placement of guides, such as pulley 64, and distal fasteners, such as eye and bolt 54 and 66, need not be constrained to maintain a linear relation between the movement of screen 96 and lens plane 16 relative one to the other and changes in the length of distal portion 32, as computer 80 may be programmed to accommodate a nonlinear relationship between the length of extension portion 32 of flexible extension member 30 drawn or coiled on drum 42 and the change in distance between lens standard 18 and screen standard 19. Further, small nonlinearities in the relation between a change in the length of distal portion 32 of flexible extension member 30 and a change in separation distance between lens 16 and image screen 20, such as may result from a nonparallel relation of lateral camera axis C and extension portion 32 extending from reel 40 to attachment point 51 as seen in FIG. 6, will frequently be insignificant to the computation of correction angle α or in depth of field calculations.

While an exemplary apparatus and method for focusing a photographic camera comprising a preferred embodiment of the present invention has been shown, it will be understood, of course, that the invention is not limited to that embodiment. Modification may be made by those schooled in the art, particularly in light of the foregoing teachings. For example, while transmission cable 62 has been shown to convey rotation signal from encoder 60 to computer 80 via computer port 82, radio, infrared or photoelectric transmission means may be utilized to convey the rotational signals. It is, therefore, contemplated by the attached claims to cover any such modification which incorporates the essential features of this invention or encompasses the true spirit and scope of the invention.

I claim:
1. A photographic camera comprising:

a lens standard supporting an optical lens having a lens optical axis;

a screen standard supporting an image screen having a screen optical axis, at least one of said lens standard and said screen standard movable to translate in a direction generally parallel to a longitudinal camera axis to vary a distance along the longitudinal camera axis by which said lens and said screen are separated;

a flexible extension member having a reel end and a distal end;

reel means for reeling said flexible member, said reel means including retention means for maintaining said reel means in fixed geometric relation to one of said first standard and said second standard, drum means for coiling said flexible member said drum means rotatable about a drum axis, tensioning means for urging said drum means to rotate in a reeling direction about its axis, and rotation signaling means for generating a rotation signal in response to rotation of said drum means about said drum axis;

attachment means for maintaining a distal end portion of said extension member adjacent said distal end in fixed geometric relation to the other of said first standard and said second standard; and a reel end portion of said extension member adjacent said reel end is coiled about said drum means such that, when said distance is decreased or increased, said drum means is caused to rotate about the drum axis in said reeling direction or in an opposite, unreeling direction, respectively.

2. A photographic camera as in claim 1 further comprising:

computer means for receiving input and generating corresponding output, said computer means comprising a central processing unit, a rotation signal input port for receiving said rotation signal, data input means, and display means for display of output.

3. A camera as in claim 2, in which said data input means includes nominal indication means for inputting an indication when the lens standard and the screen standard are in nominal positions and said distance is a nominal distance and second indication means for inputting a second indication when the lens standard and the screen standard are in second positions and said distance is a second distance.

4. A photographic camera as in claim 3 in which said computer includes length computation means for computing a length corresponding to rotation signals generated by said rotation signaling means during a time period beginning at a time a nominal indication is inputted and ending at a time a second position indication is inputted said length indicative of a difference, $\delta s$, of a length by which said lens standard and said screen standard are separated at the time said nominal indication is inputted and a length by which said lens standard and said screen standard are separated at the time said second indication is inputted.

5. A photographic camera as in claim 4, in which said image screen comprises index means to allow an image screen distance between an origin and a point upon said image screen to be determined visually.

6. A photographic camera as in claim 5 in which at least one of said lens and said screen is rotatable about an axis of rotation normal to its optical axis.

7. A photographic camera as in claim 6 in which said data input means includes screen distance input means for inputting a first distance $d_1$ determined at the time of a nominal indication, a second distance $d_2$ determined at the time of a second indication and an angular value $\Phi$, and said computer means further comprises angle computation means for computing an angle $\alpha$ in accordance with the relation.

8. A photographic camera as in claim 7, further comprising means for determining an angle of inclination between the longitudinal camera axis and a horizontal plane.

9. A photographic camera as in claim 6 in which the data input means includes screen distance input means for inputting a first distance $d_1$ determined at the time of a nominal indication; and inputting a second distance $d_2$ at the time of a second indication, and for inputting an angular value $\Phi$ and said computer means further comprises angle computation means for computing an angle $\alpha$ in accordance with the relation:

$$\tan \alpha = \frac{\delta s \cos \Phi}{d_1 + d_2 + \delta s \sin \Phi}$$

10. A photographic camera as in claim 4 in which said data input means includes means for inputting a nominal indication when said lens standard and said screen standard are separated by a nominal distance, N, measured along the longitudinal camera axis which causes an image of a first object point to be focused upon the image screen and means for inputting a second indication when said image standard and said lens standard are separated by a distance, F, measured along the longitudinal camera axis which causes an image of a second object point farther from said lens than the first object point to be focused upon the image screen, and memory means for retaining a value L representative of a lens focal length, and a value Z representative of a circle of confusion, and computation means, for computing an optimum aperture in accordance with the formula $$FS = \frac{(N - F)}{Z(2 + M_F + M_N)} \text{ where}$$

$$M_F = \frac{F - L}{L} \text{ and } M_N = \frac{N - L}{L}$$

11. A photographic camera as in claim 10 further comprising computation means for computing an optimum distance of separation O for the lens standard and screen standard along the longitudinal camera axis in accordance with the relation $$O = N - [FS \cdot Z \cdot (1 + M_N)] \text{ where } M_N = \frac{N - L}{L}$$

12. A photographic camera as in claim 1 in which the other of said first standard and said second standard is fixably mounted upon a carrier and said attachment means is fixedly mounted on said carrier.

13. A photographic camera as in claim 12 in which said attachment means comprises a rigid elongate pin having a base and mounted upon said carrier and extending away from said carrier to a distal end attached to said flexible member.

14. A photographic camera as in claim 1 in which said attachment means comprises a hook.

15. A photographic camera as in claim 1 in which said attachment means comprises an eye and a threaded fastener.

16. A photographic camera as in claim 1, further comprising guide means for laterally displacing a portion of said flexible extension member.

17. A photographic camera as in claim 16 in which said guide means comprises a pulley with a cylindrical surface and a portion of said cylindrical surface is imposed against said flexible member at a point lying between said distal end and said reel means.

18. A method for focusing a photographic camera, the camera comprising a lens standard supporting a lens having a lens optical axis, a screen standard supporting an image screen having a screen optical axis, at least one of said lens and said screen rotatable about an axis of rotation normal to its optical axis and at least one of said lens standard and said screen standard movable to translate in a direction generally parallel to a longitudinal camera axis to vary a distance by which said lens and said screen are separated, the method comprising the steps of:

A. fixing a drum to one of the lens standard and the screen standard in such a manner that the drum is free to rotate about a drum axis;

B. providing a flexible extension member having a drum end and a distal end;

C. attaching the distal end to move in fixed relation to the other of the lens standard and the screen standard;

D. coiling a drum end portion of the flexible member, adjacent said drum end, about the drum;

E. applying a rotational bias to said drum such that the flexible member comprises an extension end portion extending under tension from the drum to the other standard and the drum end portion coiled about the drum;

F. providing index markings on the image screen to allow determination of distances separating points on the image screen from an origin on the screen;

G. placing the screen and a plane of the lens normal to the optical axis of the lens in parallel relation and determining an angle $\Phi$ formed between said lens optical axis and the camera axis;

H. causing the lens standard and the screen standard to be positioned such that a first point of a desired image is focused upon the image screen and, while the lens standard and the screen standard are so positioned, determining and noting a distance $d_1$, separating the first point upon the image screen from the origin and noting a nominal angular position of the drum about the axis;

I. causing said lens standard to be newly positioned such that a second point of the desired image is focused upon the image screen and, while the lens standard and the screen standard are so positioned, determining and noting a distance, $d_2$, separating the second point upon the image screen from the origin and noting an angular displacement of the drum from the nominal angular position about the drum axis;

J. calculating a change in length of the distal portion of the flexible member, $\delta s$, corresponding to the angular displacement of the drum;

K. calculating a correction angle in accordance with the relation $$\sin \alpha = \frac{\delta s \cos \Phi}{d_1 + d_2}$$

L. rotating the lens a rotational displacement according to the correction angle.

19. A method for focusing a photographic camera, the camera comprising a lens standard supporting a lens having a lens optical axis, a screen standard supporting an image screen having a screen optical axis, at least one of said lens and said screen rotatable about an axis of rotation normal to its optical axis and at least one of said lens standard and said screen standard movable to translate in a direction generally parallel to a longitudinal camera axis to vary a distance by which said lens and said screen are separated, the method comprising the steps of:

A. fixing a drum to one of the lens standard and the screen standard in such a manner that the drum is free to rotate about a drum axis;

B. providing a flexible extension member having a drum end and a distal end;

C. attaching the distal end to move in fixed relation to the other of the lens standard and the screen standard;

D. coiling a drum end portion of the flexible member, adjacent said drum end, about the drum;

E. applying a rotational bias to said drum such that the flexible member comprises an extension end portion extending under tension from the drum to the other standard and the drum end portion coiled about the drum;

F. providing index markings on the image screen to allow determination of distances separating points from an origin on the screen;

G. placing the screen and a plane of said lens normal to the optical axis of said lens in parallel relation and determining an angle $\Phi$ formed between said lens plane and a vertical plane;

H. causing the lens standard and the screen standard to be positioned such that a first point of a desired image is focused upon the screen and, while the lens standard and the screen standard are so positioned, determining and noting a distance $d_1$, separating the first point upon the screen from the origin and noting a nominal angular position of the drum about the axis;

I. causing said screen standard to be newly positioned such that a second point of the desired image is focused upon the screen and, while the lens standard and the screen standard are so positioned, determining and noting a distance, $d_2$, separating the second point upon the screen from the origin and noting an angular displacement of the drum from the nominal angular position about the drum axis;

J. calculating a change in length of the distal portion of the flexible member, $\delta s$, corresponding to the angular displacement;

K. calculating a correction angle in accordance with the relation $$\tan \alpha = \frac{\delta s \cos \Phi}{d_1 + d_2 + \delta s \sin \Phi}$$

L. rotating the lens a rotational displacement according to the correction angle.

20. A method for focusing a photographic camera, the camera comprising a lens standard supporting a lens having a lens optical axis, a screen standard supporting an image screen having a screen optical axis, at least one of said lens and said screen rotatable about an axis of rotation normal to its optical axis and at least one of said lens standard and said screen standard movable to translate in a direction generally parallel to a longitudinal camera axis to vary a distance by which said lens and said screen are separated, the method comprising the steps of:
A. fixing a drum to one of the lens standard and the screen standard in such a manner that the drum is free to rotate about a drum axis;
B. providing a flexible extension member having a drum end and a distal end;
C. attaching the distal end to move in fixed relation to the other of the lens standard and the screen standard;
D. coiling a drum end portion of the flexible member, adjacent said drum end, about the drum;
E. applying a rotational bias to said drum such that the flexible member comprises an extension end portion extending under tension from the drum to the other standard and the drum end portion coiled about the drum;
F. positioning said screen standard and said lens standard a known distance apart and, with the lens standard and the screen standard so positioned, noting the angular position of the drum about the axis;
G. causing the lens standard and the screen standard to be positioned such that a farthest point of a desired depth zone of focus is focused upon the screen, noting the angular position of the drum about the axis and determining a distance, F, separating the image screen standard from the lens standard by adding a change in distance corresponding to an angular displacement of the drum to the know distance;
H. causing the lens standard and the screen standard to be positioned such that a nearest point of a desired depth zone of focus is focused upon the screen, noting the angular position of the drum about the axis and determining a distance, N, separating the image screen standard from the lens standard by adding a change in distance corresponding to an angular displacement of the drum to the known distance;
I. calculating an optimum aperture, FS, for achieving the required depth of field and optimum image definition according to the relation $$FS = \frac{(N - F)}{Z(2 + M_F + M_N)} \text{ where}$$

$$M_F = \frac{F - L}{L} \text{ and } M_N = \frac{N - L}{L}$$

21. A method for focusing a photographic camera as in claim 20 further comprising the step of calculating an optimum distance, O, the lens standard is to be spaced from the image screen standard to achieve required depth of field at the optimum aperture according to the equation $O = N - [FS \cdot Z(1 + M_N)]$.

* * * * *